United States Patent Office 3,663,717
Patented May 16, 1972

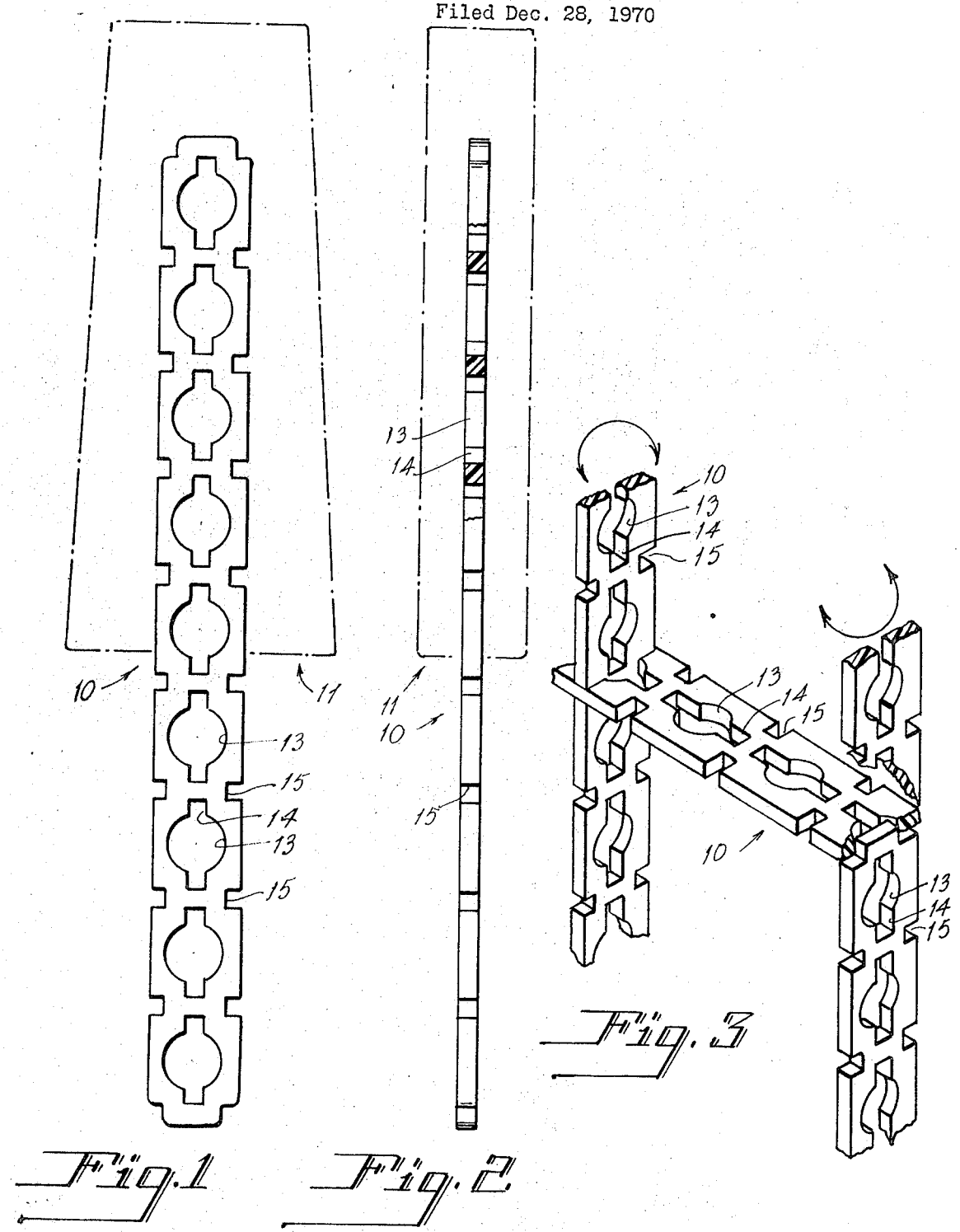

3,663,717
INTERLOCKABLE CONFECTION BARS
Maurice Simon Coster, Tel Aviv, Israel, assignor to Borden, Inc., New York, N.Y.
Continuation of abandoned application Ser. No. 729,569, May 16, 1968. This application Dec. 28, 1970, Ser. No. 102,072
Int. Cl. A63h 33/08
U.S. Cl. 99—137
9 Claims

ABSTRACT OF THE DISCLOSURE

This invention relates to an elongated rectangular bar of a substantially uniform thickness for mounting a frozen comestible and comprises at least one aperture and at least one pair of transverse aligned notches, said aperture comprising a circle having diametrically opposed notches, the width of said transverse and diametrically opposed notches being greater than the thickness of said bar, the dimension between the inner edges of said transverse notches being less than the diameter of said circle, the dimension between the outer edges of said diametrically opposed notches being greater than the width of said bar.

This application is a continuation of application S.N. 729,569, filed May 16, 1968, and now abandoned.

BACKGROUND OF THE INVENTION

Heretofore, frozen confections such as ice cream, flavored ice and the like have been mounted on a bar or strip of material, usually wood, which serves as a handle while the user devours same. Once eaten, the remaining stick is discarded in the conventional manner. Because of the high levels of consumption of these confections, a substantial number of bars are discarded and thereafter disposed of as rubbish and garbage.

In the prior art of frozen confections, various uses for the discarded bars have been suggested. For example, notches have been provided on the edges of the stick so that by gathering several such sticks, the collector can so arrange them as to form toy building constructions such as log cabins, derricks, and the like. Nevertheless, none of the uses suggested have contemplated the construction of a structure having a lasting character, i.e., the joints formed by the notched confection bars have not lent themselves to any kind of rigid enduring construction. While the known notched confection bars have the advantage of quick disassembly, nonetheless any vibration of the base or surface on which the structure rests will normally result in total collapse of same. Consequently, the notched confection bars heretofore made available to the public have not been favorably received. If a confection bar could be developed which permits a releasable yet rigid interconnection with other bars so that a lasting structure can be erected, it is believed that the market for frozen confections would be greatly enhanced.

SUMMARY OF THE INVENTION

The present invention overcomes the heretofore stated deficiencies of the prior art of confection bars and has as its primary object the suggestion of an interlocking joint between such bars in order to form rigid structures which may be readily disassembled by the user. Alternatively, the bars may be sold individually in quantities without initially serving as handles for a confection.

Briefly stated, the present invention comprises a plurality of elongated rectangular bars having a substantially uniform thickness which may mount frozen confections, each bar comprising at least one aperture and a pair of transversely aligned notches, said aperture comprising a circle and diametrically opposed notches, the width of said transverse and diametrically opposed notches greater than the thickness of said bar, the dimension between the inner edges of said traverse notches less than the diameter of said circle, the dimension between the outer edges of said diametrically opposed notches greater than the width of said bar whereby the width and thickness of a first bar may be inserted through the aperture of the second until the two transverse notches of said first bar are aligned with the thickness of said second bar, whereupon both bars may be rotated to form a releasable interlocking joint.

BRIEF DESCRIPTION OF THE DRAWING

The various features of the apparatus of this invention will become apparent from the following detailed description set forth in connection with the accompanying drawing which relates to the preferred embodiment of the present invention and is given by way of illustration.

FIG. 1 is a perspective view of the preferred embodiment of the present invention.

FIG. 2 is a side view of the preferred embodiment.

FIG. 3 is an isometric view illustrating the interlocking joint formed by the interconnection of two confection bars.

DETAILED DESCRIPTION OF THE INVENTION

Referring now to the preferred embodiment illustrated in FIG. 1, there is set forth a confection bar 10 on which is conventionally mounted a frozen ice cream or flavored ice 11 so that the lower portion of the bar extending therefrom serves as a handle which the user grasps as he eats the confection. The bar 10 is preferably formed of a resilient plastic material, but other materials such as wood, spring steel or the like may be used. It includes a plurality of spaced apertures 12, each of which includes a circular portion 13, the axis of which, in the preferred embodiment, projects at right angles to the longitudinal center line of the bar. The apertures 12 also include on either side projecting outwardly from the circle along the longitudinal center of the bar a pair of diametrically opposed notches 14. It should be appreciated that the apertures 12 receive the confection therein in its frozen state and insure that no relative movement of the confection is permitted, regardless of the low coefficient of friction which plastic materials generally possess.

Intermediate each of the spaced apertures 12 are a pair of inwardly projecting transversely aligned notches 15 of equal width. In order to maximize the use of the limited working area on the bar 10, in the preferred embodiment, each of the inwardly projecting edges of notches 15 lie in the same plane as the outer edge of the diametrically opposed notches 14 of each of the spaced apertures.

It is desired to effect a right angle interlocking joint between a pair of confection bars which is substantially absent of any relative movement or "play." Accordingly, it should be apparent that the dimensions of the apertures and notches are critical in order to matingly receive the complementary notches and apertures of a second bar. In the preferred embodiment, the width of the transverse notches 15 are substantially equal to the width of the diametrically opposed notches 14 and in turn approximately equal to the thickness of the bar 10. The diameter of the circular portion 13 is equal to or slightly greater than the dimension between the inner edges of the transversely aligned notches 15. Moreover, the dimension between the outer edges of the diametrically opposed notches 14 should be equal to or slightly greater than the width of the bar 10. As is well-known in the coupling and joint art, various tolerances and allowances may be made to the dimensions of the mating elements to insure a force fit of these elements to form a rigid joint.

In operation, once the frozen confection has been devoured by the user and a number of bars 10 have been collected, a rigid construction unit may be formed by positioning one bar at right angles to a second bar and inserting the width and thickness of the first into the aperture 12 of the second through the diametrically opposed notches 14 until one of the pairs of transversely aligned notches on the second bar is aligned or meshes with the thickness of the first bar. The first bar may then be rotated in the circular portion 13 of the second bar, as is illustrated in FIG. 3, to form a rigid interlocking joint between the two. It should thus be apparent that by utilizing this interlocking joint, a substantial number of bars may be interconnected to form a rigid structure. Alternatively, the transverse notches 15 of several bars may be interconnected with others to form a wall or other like structure. It should be obvious to any collector of these bars with only the slightest degree of ingenuity that a spate of designs of rigid structures may be readily assembled and thereafter disassembled.

Although one embodiment of the present invention has been herein illustrated and described, it will be evident to those skilled in the art that various modifications may be incorporated into the details of production without departing from the principles herein set forth.

What is claimed is:

1. An elongated rectangular bar of a substantially uniform thickness having at least one aperture and at least one pair of transversely aligned notches, said aperture comprising a circle having diametrically opposed notches, the width of said transverse and diametrically opposed notches being greater than the thickness of said bar, the dimension between the inner edges of said transverse notches being less than the diameter of said circle, lengthwise diameter between successive transversely aligned notches being substantially equal to the width of the bar, the longitudinal dimension between the outer edges of said diametrically opposed notches being substantially equal to the width of said bar but with sufficient tolerance to insure a force fit of the longitudinal edge dimension between successive transversely aligned notches.

2. The bar of claim 1 wherein the axis of said aperture is disposed at right angles to the width of said bar.

3. The bar of claim 1 wherein the axis of said aperture is disposed on the longitudinal center line of said bar.

4. The bar of claim 1 wherein said diametrically opposed notches are disposed axially on the longitudinal center line of said bar.

5. The bar of claim 1 including a plurality of said apertures and a plurality of transversely aligned notches positioned in the spaces between said apertures.

6. The bar of claim 5 wherein the axes of said apertures are disposed on the longitudinal center line of said bar.

7. The bar of claim 1 wherein the dimension between the inner edges of said transverse notches is such that a force fit can be effected between this dimension and said circle.

8. A product comprising a frozen comestible and a rectangular bar of claim 1 disposed partly within said comestible, said aperture and notches receiving said comestible to prevent relative movement between said bar and said comestible.

9. A product comprising a frozen comestible and a rectangular bar of claim 6 disposed partly within said comestible, said aperture and notches receiving said comestible to prevent relative movement between said bar and said comestible.

References Cited

UNITED STATES PATENTS

| 598,749 | 2/1898 | Sexton | 46—28 |
| 2,712,200 | 7/1955 | Dearling | 46—28 |
| 2,844,910 | 7/1958 | Korchak | 99—137 |

FOREIGN PATENTS

| 164,486 | 8/1955 | Australia. |
| 207,086 | 2/1909 | Germany. |

TIM R. MILES, Primary Examiner

U.S. Cl. X.R.

46—28; 99—138 S